United States Patent [19]

Köppel

[11] Patent Number: 5,433,570

[45] Date of Patent: Jul. 18, 1995

[54] SCREW WITH UNTHREADED PORTION FORMED FOR ABSORBING BENDING LOADS

[75] Inventor: Norbert Köppel, Balgach, Switzerland

[73] Assignee: SFS Industrie Holding AG, Heerbrugg, Switzerland

[21] Appl. No.: 182,073

[22] Filed: Jan. 13, 1994

[30] Foreign Application Priority Data

May 15, 1993 [DE] Germany ............... 42 16 197.5

[51] Int. Cl.⁶ ............... F16B 35/00; F16B 35/04
[52] U.S. Cl. ............... 411/392; 411/387; 411/413
[58] Field of Search ............ 411/392, 411, 424, 412, 411/413, 3-5, 387

[56] References Cited

U.S. PATENT DOCUMENTS

| | | | |
|---|---|---|---|
| 1,926,925 | 9/1933 | Wescott | 411/392 X |
| 3,630,253 | 12/1971 | Sherman | 411/424 X |
| 3,682,507 | 8/1972 | Wand | 411/413 |
| 3,966,341 | 6/1976 | Bailey et al. | 411/392 X |
| 4,229,875 | 10/1980 | Grispell | 411/392 X |
| 4,338,054 | 7/1982 | Dahl | 411/424 |
| 4,878,793 | 11/1989 | Hewison | 411/413 X |
| 4,941,337 | 7/1990 | Emery | 411/392 X |

FOREIGN PATENT DOCUMENTS

| | | |
|---|---|---|
| 0090453 | 10/1983 | European Pat. Off. |
| 0313927 | 5/1989 | European Pat. Off. |
| 590969 | 4/1934 | Germany. |
| 2126914 | 12/1971 | Germany. |
| 2233560 | 2/1973 | Germany. |
| 3322861 | 2/1984 | Germany. |

*Primary Examiner*—Neill R. Wilson
*Attorney, Agent, or Firm*—Helfgott & Karas

[57] ABSTRACT

A screw has an elongated shank and a head. The shank has two threaded portions and at least one unthreaded portion extending therebetween. A plurality of axially spaced grooves formed by the removal of material from the unthreaded portion of the shank are provided therein to enable the screw to withstand transverse forces acting on the head when the screw is screwed in.

6 Claims, 1 Drawing Sheet

SCREW WITH UNTHREADED PORTION FORMED FOR ABSORBING BENDING LOADS

BACKGROUND OF THE INVENTION

The invention pertains to a screw with a shank provided with a thread along a part of its length, and a screw head, where between a thread located at the free end of the shank and the screw head there is at least one unthreaded shank section. Screws of this type are used, for example, in the mounting of sandwich elements to a wall and roof lining, in the attachment of roof elements like, e.g., corrugated plates, or even in the attachment of cover sheets to a flat roof. The screw grips into a solid substrate, e.g., a steel or wooden support or a sheet metal structure by means of the thread formed on the free end region, and projects relatively far away from this solid substrate. This occurs because the screws have to be appropriately long due to the shaping of the plates, the thickness of the sandwich elements and/or the thickness of the insulation to be penetrated.

Now there are always problems with these screws since they are subject not only to longitudinal and transverse tensile forces during this type of attachment, but also due to the bending. This bending load results from the differing temperature deformation of the solid under-structure and the external surface of the reinforced part. In a sandwich plate for example, a relatively high temperature difference is obtained between the outer and the inner shell when the outer shell is heated by solar radiation.

The fasteners commonly in use today in these applications are placed under severe stress due to this effect, since the entire bending of the screw head is transferred to the thread formed on the free end of the shank. This alternating bending in the region of the thread leads to crack formation in the threaded core after a corresponding number of alternating motions, and thus necessarily to its fracture.

SUMMARY OF THE INVENTION

It is an object of the present invention to provide a fastener or a screw of the type described above, where the threaded region is freed of the bending load at least to the extent that in the region of the threaded core a crack formation due to bending load can be eliminated.

According to the invention this is attained in that in the unthreaded section of the shank there is a groove prepared through the removal of material, that is designed as a closed groove around the circumference.

Due to this invention the bending load on the fastener is absorbed by the unthreaded section of the shank, and particularly by the sections thinned out by the groove or grooves.

An essential inventive step in this case is that these grooves are produced by the material removal, for example, by milling or grinding, since only thus will an appropriate weakening of the material occur so that the screw or fastener will be elastic only in this region. The very long inelastic zone otherwise present due to the invariant wire diameter imparted by the compression technique, will now be converted by this groove or grooves into an elastic zone that absorbs the bending load. An optimal improvement in bending behavior will be obtained, where in addition this bending load will be alleviated in the threaded region that is particularly susceptible due to the peaking effect.

It is precisely the production of the groove by the material removal that produces this elastic effect of the unthreaded section of the shank. Now if these grooves were produced by a roller process, then in the region of the grooves a stiffening would occur, since the fibers in this region would be compressed even more. In tests it has also been shown that the problem of the invention cannot be solved by a roller process for the production of this groove, since then the bending load will still be transferred to the thread formed on the free end of the screw and the unthreaded region of the shank will remain inelastic in spite of the grooves produced by rolling in.

Furthermore, according to the present invention it is proposed that the remaining cross section of the shank at the base of the groove correspond at least to the core cross section of the following threaded region in the direction of the free end of the shank. This will ensure that the torque needed by a self-boring screw or fastener for the drilling process and the production of the thread can be transferred, and that the necessary values for the tensile loading will be retained. Thus it also proved expedient that the residual cross section in the region of the groove should not fall below the core cross section in the threaded region.

According to one variant embodiment it is proposed that two or more grooves following each other and positioned with an axial spacing or directly adjoining each other be provided in one unthreaded section or be distributed to several unthreaded sections. Depending on the necessary elasticity of the unthreaded section of the shank and the necessity to absorb bending forces in certain regions relative to the length of the shank, various variant embodiments are thus possible in order to allow an adaptation to particular applications.

Therefore in this regard it is possible that the grooves following each other in the axial direction have the same dimensions. On the other hand it is possible that grooves following each other in the axial direction have different dimensions and/or cross-sectional shapes. Thus it is possible in various ways and manners to furnish screws for specific applications with a specific bending behavior.

Another embodiment provides that the remaining cross section of the shank bounded by the base of the groove is of circular or polygonal shape in its outer bound. A circular outer bound can be produced both by a milling or also by a grinding process, while a polygonal outer bound can only be produced by a grinding process.

Additional properties of the invention and special advantages are explained in greater detail below in the following description based on the figures.

DETAILED DESCRIPTION OF THE PREFERRED EMBODIMENTS

Figure 1:
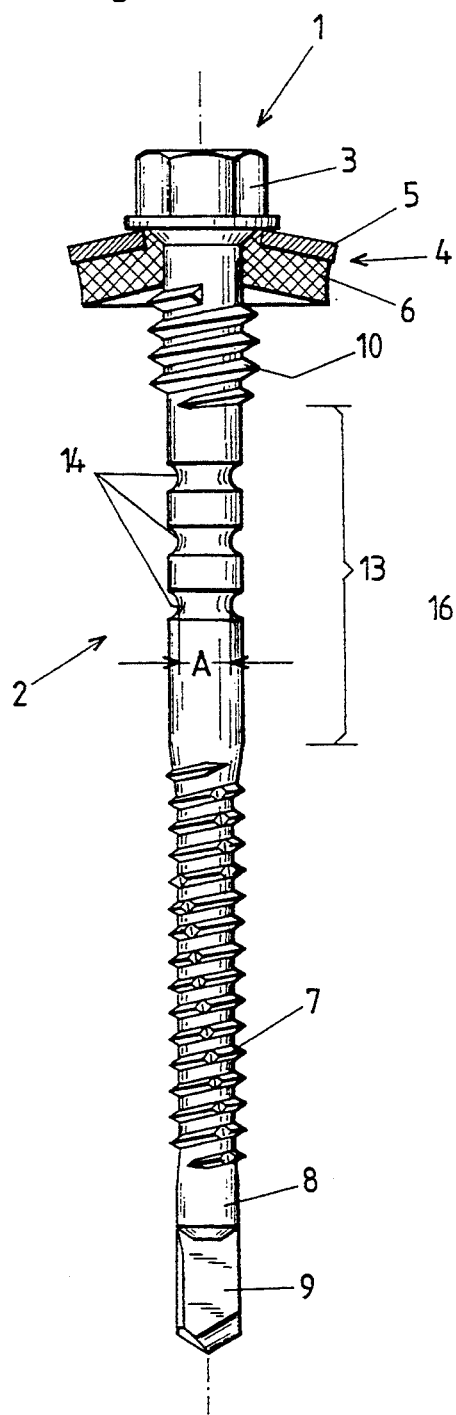
FIG. 1 is a front view of a screw, where a washer associated with the screw is illustrated in cross section.

The fastener or screw 1 includes a shank 2 and a screw head 3. Below the screw head there is a washer 4 that can be made for example of a metal disk 5 and a sealing gasket 6. However, this washer 4 has nothing to do with the present invention.

At the free end of the shank 2 there is a thread 7 and on the free end 8 there is a drill bit 9. The drill bit 9 is presented here as a plate-like component. Of course, any type of drilling bit can be employed, or it is even possible that no drilling bit at all is used, since it would also be possible to have a screw that can be screwed into a prepared hole and cut the threads as it goes in, or it could even be a screw that is screwed into a prepared, threaded hole.

With regard to the screw or fastener 1 shown in the drawings, a second threaded section 10 is provided that is used as a support thread in order to brace the upper cover plate 12 in the reinforcement of sandwich elements 11.

The screw 1 has at least one unthreaded shank section 13 where in this unthreaded shank section 13 at least one groove 14 designed as a closed groove around the circumference is provided. In the illustrated embodiment, three such grooves 14 are provided. These grooves have been produced by material removal, that is, by milling or grinding for example, and this means that the unthreaded section 13 of the shank becomes an elastic section of the shank. The residual cross section remaining at the base of the groove 14 corresponds to diameter A and corresponds at least to the core cross section of the following threaded region 7 in the direction of the free end 8 of the shank, so that therefore the required cross section for the applied torque is provided during the drilling process and during the cutting of the threads.

The grooves 14 following each other in an axial direction have the same dimensions in the illustrated embodiment and follow each other at an axial distance from each other. Within the framework of the invention it would also be possible that these sequentially following grooves could adjoin each other directly and be positioned not only in an unthreaded section 13 of the shank, but rather they could be distributed to several unthreaded sections 13 of the shank. A corresponding use of the present invention would also be possible for screws where several threaded sections or other regions are provided that follow each other at a specific spacing, between them again smooth shank sections are provided. It would also be possible that the grooves 14 following each other in an axial direction have different dimensions and/or cross-sectional shapes. The figure shows one embodiment where the cross section of the grooves is designed approximately as a semicircle. But it would also be possible to design this groove cross section as a polygon or as a trapezoid for instance.

The remaining cross section of the shank 2 bound by the base of the groove 14 is designed as a circle with diameter A in the illustrated embodiment. With this kind of circular design of the remaining cross section, the groove 14 can be cut out by either a milling or a grinding process. But it would also be possible to design this remaining cross section with a polygonal outer bound, where then the production can proceed of course only by a grinding method.

Figure 2:
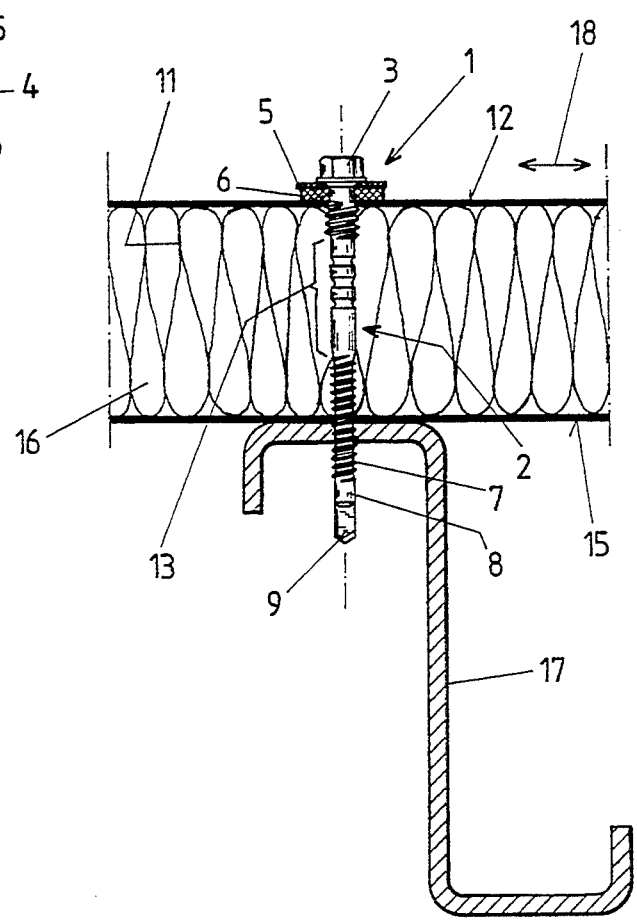
FIG. 2 shows a practical example for this type of the screw in the attachment of a sandwich element to a metal support, shown in cross section.

FIG. 2 shows this kind of screw 1 in use for the attachment of a sandwich element 11. These sandwich elements 11 as a rule consist of an outer cover plate 12, an inner cover plate 15 and also an insulation 16 in between. This sandwich element 11 should be attached to a solid substrate that is formed here by a metal support 17. The screw is screwed through the sandwich element 11 into the support 17, where this will effect the attachment. In the case of solar radiation onto the outer cover plate 12, due to thermal expansion relative shifts will result between the cover plate 12 and the cover plate 15 in the direction of the arrow 18. Since the screw 1 cannot move with respect to the cover plate 12 or with respect to the cover plate 15, a corresponding bending load on the shank 2 of the screw will result. These alternating bending loads will be absorbed by the configuration according to the invention of the unthreaded section 13 of the shank and will not be directed into the thread 7 as before. In the unthreaded section of the shank a relatively elastic region is produced that can experience a maximum number of alternating motions without any danger of fracture.

In the same manner the design according to the invention can be used for screws or other fasteners that are employed for example in the attachment of corrugated plates on roofs or on walls or in the attachment of foils to flat roofs. The designs according to the invention will have a particularly favorable effect when screws or other fasteners made of a non-rusting material are used. These screws made of a relatively expensive material should be designed with a view toward a long service life. Due to the potential for forming of a flexible, elastic region in the area of the screw shank, the danger of fracture in the threaded area will be eliminated and thus also the life span of the screws or other fasteners will be increased.

I claim:

1. A screw including an elongated shank, and a screw head, said shank including a first threaded portion at a part thereof adjacent said head, a second threaded portion extending over a part of the length thereof adjacent a free end of said shank, and at least one unthreaded section, said at least one unthreaded section extending between said first and second threaded portions and being formed with a plurality of grooves traversal to an axis of the screw and spaced from each other in a direction of said axis, said grooves being formed over a part of said unthreaded section, spaced from said first and second threaded portions, each groove being prepared through removal of material from said shank and designed as a closed groove around the circumference to give elasticity to said unthreaded section to absorb bending loads when the screw is in use.

2. Screw according to claim 1, wherein the remaining cross section of the shank at a base of each groove corresponds at least to core cross section of an adjacent second threaded portion extending in the direction of the free end of the shank.

3. Screw according to claim 1, wherein said grooves are distributed in several unthreaded sections.

4. A screw according to claim 1, wherein said grooves have the same dimensions.

5. Screw according to claim 1, wherein said grooves have different cross-sectional shapes.

6. Screw according to claim 1, wherein the remaining cross section of the unthreaded section of said shank bounded by a base of a groove is of circular or polygonal shape in its outer perimeter.

* * * * *

UNITED STATES PATENT AND TRADEMARK OFFICE
CERTIFICATE OF CORRECTION

PATENT NO. : 5,433,570
DATED : July 18, 1995
INVENTOR(S) : Norbert Koppel

It is certified that error appears in the above-identified patent and that said Letters Patent is hereby corrected as shown below:

On the title page, insert the following items:

[22]    PCT Filed:    March 20, 1993

[86]    PCT No.:    PCT/EP93/00949

§ 371 Date:    January 13, 1994

§ 102(e) Date:    January 13, 1994

[87]    PCT Pub. No.    WO93/23680

PCT Pub. Date    November 25, 1993 item [30], should read -- Foreign Application Priority Data

May 15, 1992 [DE]    Germany..................42 1619 7.5

Signed and Sealed this

Third Day of February, 1998

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,433,570
DATED : July 18, 1995
INVENTOR(S) : Norbert Koppel

It is certified that error appears in the above-indentified patent and that said Letters Patent is hereby corrected as shown below:

On the title page, insert the following items:

[22] PCT Filed: April 20, 1993

[86] PCT No.: PCT/EP93/00949

§ 371 Date: January 13, 1994

§ 102(e) Date: January 13, 1994

[87] PCT Pub. No. WO93/23680

PCT Pub. Date November 25, 1993 item [30], should read -- Foreign Application Priority Data

May 15, 1992 [DE] Germany..................42 1619 7.5

This certificate supersedes Certificate of Correction issued February 3, 1998.

Signed and Sealed this

Twenty-eighth Day of July, 1998

Attest:

BRUCE LEHMAN

*Attesting Officer*       *Commissioner of Patents and Trademarks*